Aug. 9, 1949.　　　　F. L. SMITH　　　　2,478,877
BEET HARVESTER

Filed June 15, 1946　　　　　　　　　　3 Sheets-Sheet 1

INVENTOR.
FRED L. SMITH.
BY
ATTORNEY.

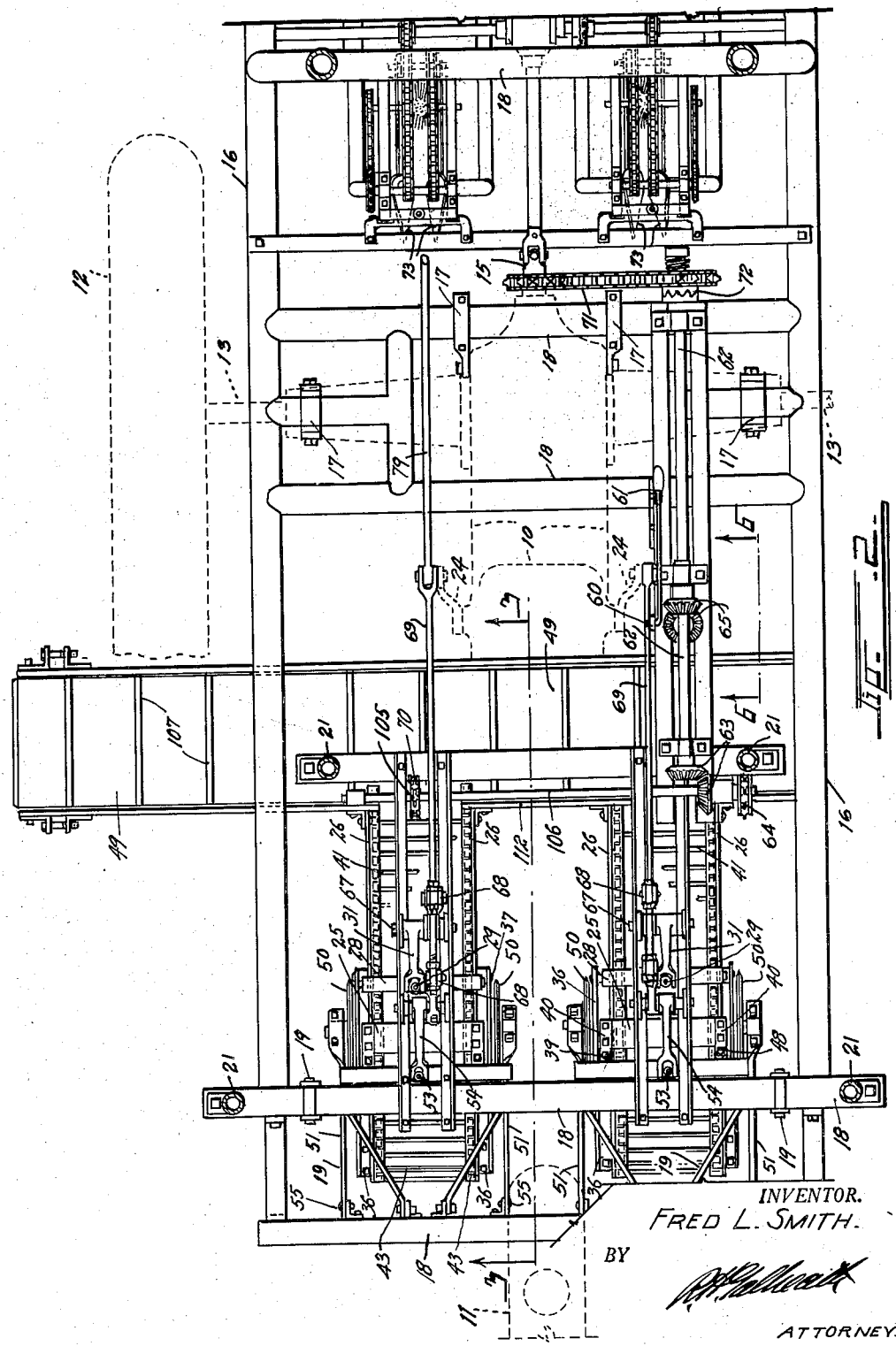

Aug. 9, 1949.  F. L. SMITH  2,478,877
BEET HARVESTER
Filed June 15, 1946  3 Sheets-Sheet 3
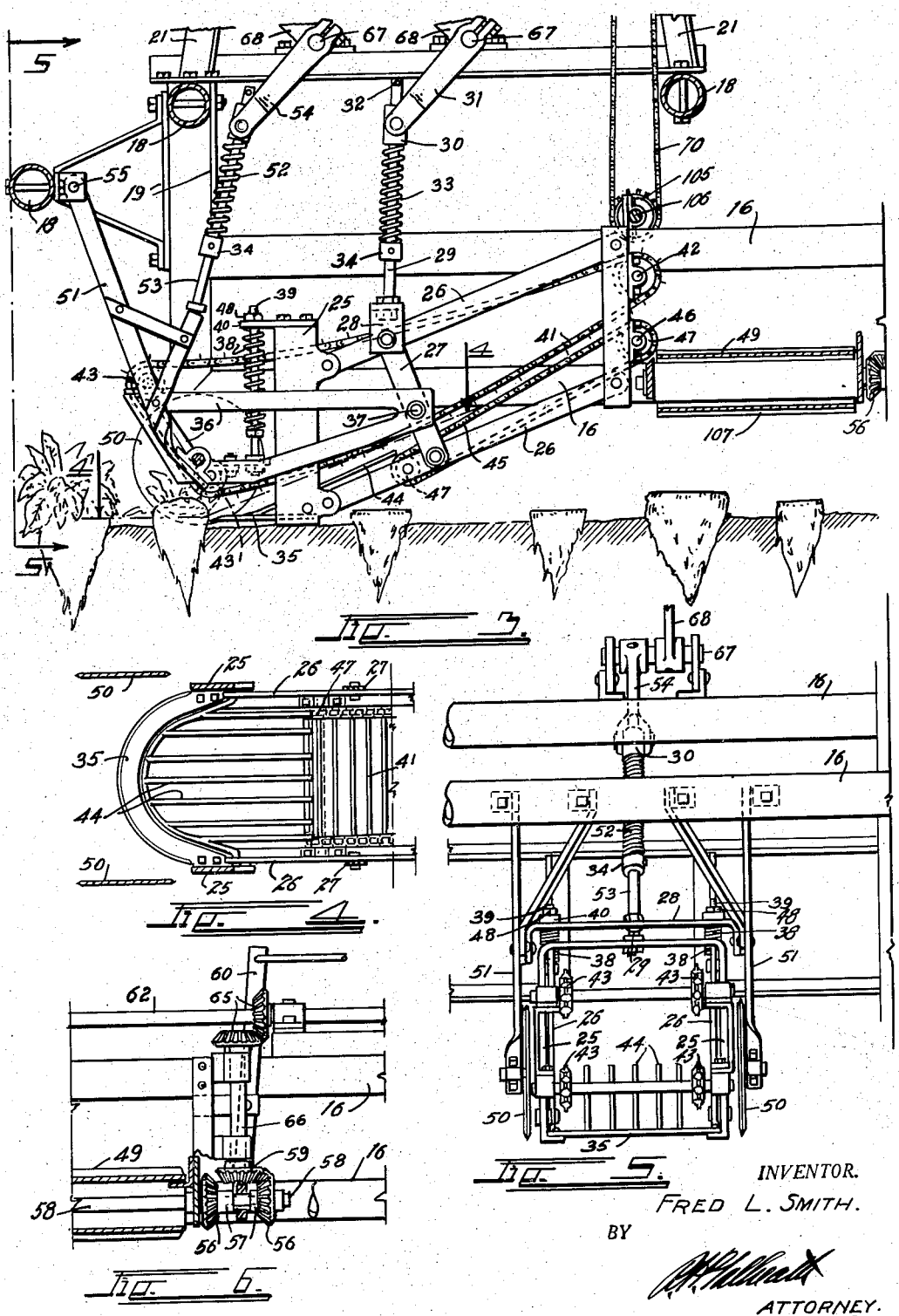
INVENTOR.
FRED L. SMITH.
BY
ATTORNEY.

Patented Aug. 9, 1949

2,478,877

UNITED STATES PATENT OFFICE 2,478,877

BEET HARVESTER

Fred L. Smith, Julesburg, Colo.

Application June 15, 1946, Serial No. 677,013

5 Claims. (Cl. 56—121.45)

This invention relates to a sugar beet harvester and has for its principal object the provision of a single, self-propelled machine which can be driven along a plurality of rows of beets, and which will automatically remove the crowns and tops from the beets, dig and elevate the latter, separate the beets from the cut tops, collect and deliver the harvested beets to any desired receiver, and pile the tops in convenient windrows on the field.

Another object of the invention is to provide a topping mechanism which will automatically proportion the severed crowns to the size of the beets.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 2 is an enlarged horizontal section of the forward portion of the improved harvester, taken on the line 2—2, Fig. 1.

Fig. 3 is an enlarged detail section, taken on the line 3—3, Fig. 7, illustrating the topping and top removing mechanism. In this view a trash cutting disc has been removed for better illustration.

Fig. 4 is a detail, horizontal section, taken on the line 4—4, Fig. 3.

Fig. 5 is a front view of the topping mechanism for one row of beets, looking on the line 5—5, Fig. 3. In this view the various endless chains have been removed for clarity of illustration.

Fig. 6 is a detail section, illustrating a top conveyor drive mechanism employed on the improved harvester. This section is taken on the line 6—6, Fig. 2.

Figure 1:
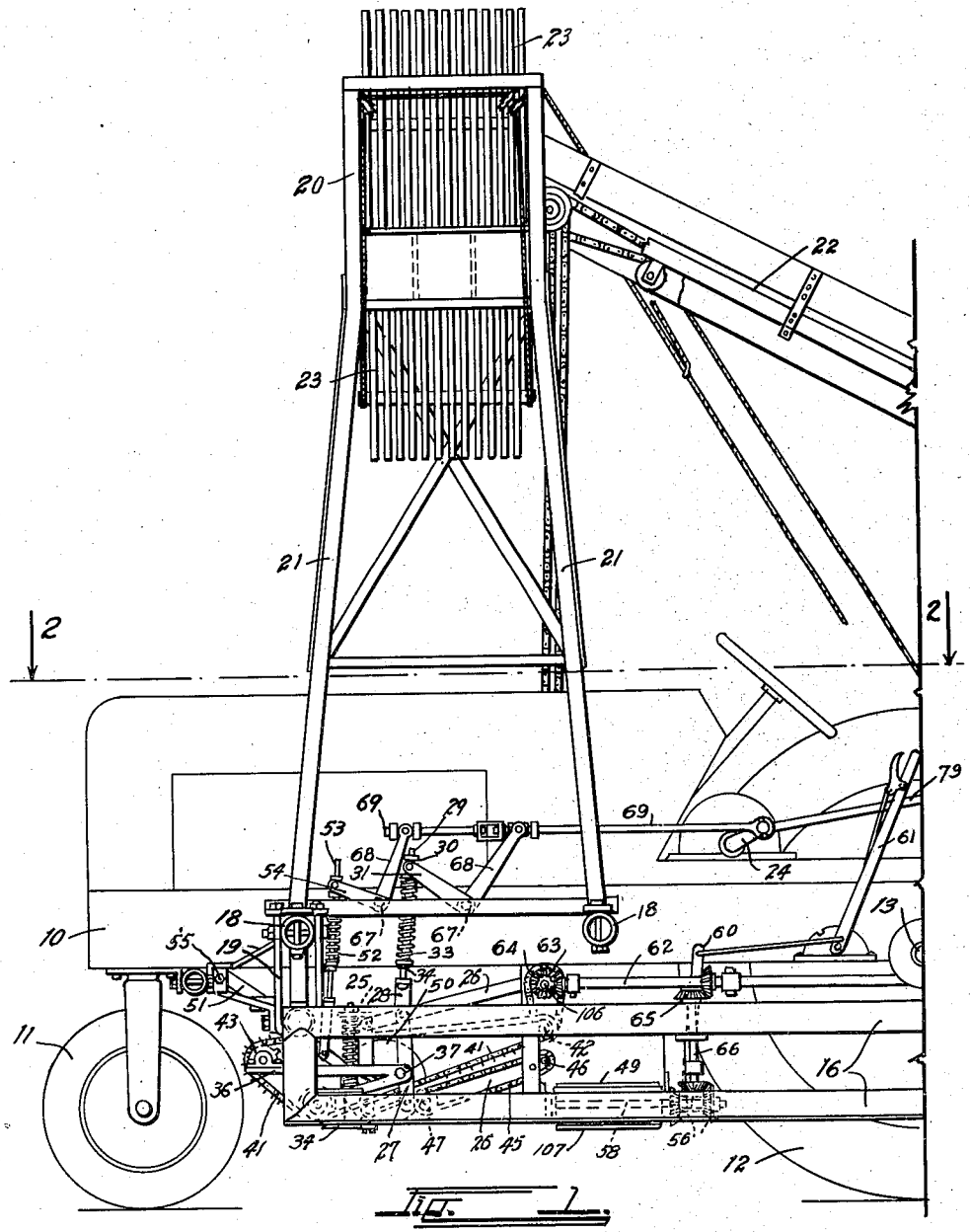
Fig. 1 is a left side elevation of the forward portion of the improved harvester.

In Figs. 1 and 2 the mechanism is shown in the raised position for transportation. In Fig. 3 the mechanism is shown in the lowered position as it would appear in use. In Fig. 2 the position of a typical tractor is indicated in broken line.

The improved harvester is designed for attachment to a conventional farm tractor and, as illustrated, is designed to simultaneously harvest two rows of beets. In the drawings, typical parts of a conventional tractor are indicated by numeral as follows: tractor chassis 10, front guide wheel 11, rear drive wheels 12, rear axle 13, seat 14, power takeoff 15, and implement lift levers 24.

The improved harvester is supported on a main frame 16, preferably but not necessarily, formed of pipe or tubing. The main frame extends along both sides of the chassis 10 and is supported at its rear from the rear axle 13 upon any suitable attachment clips 17. At the forward extremity, the main frame is suspended from cross members 18, which are secured to and extend across the chassis 10, projecting outwardly from both sides thereof, by means of suitable suspension brackets 19.

A receiving hopper 20 is supported over the forward portion of the chassis 10 upon suitable supporting legs 21 extending to the cross members 18 at the opposite sides of the chassis 10.

Briefly, the beets are topped in the ground at the front of the harvester adjacent the forward portion of the frame 16, one row at each side of the path of the guide wheel 11. The topped beets are dug by means of lifting plows 73, lifted from the ground and picked up at the rear of the frame 16 and deposited upon an elevating conveyor belt 22, which conveys them to the receiving hopper 20, from which they are dumped at desired intervals, preferably into a receiving truck, through the medium of suitable loading chutes 23. The severed tops and crowns are lifted and carried to either side of the harvester, where they are deposited in a windrow on the ground, there being one windrow for each four rows of beets. This application is directed to the topping mechanism.

The topping mechanisms for each row of beets are similar. Each comprises an inverted, U-shaped floating frame 25 suspended on the forward extremities of two pairs of parallel toggle arms 26 which are hingedly supported from cross members 112 on the frame 16. The pair of arms 26 at each side of the frame 25 are connected by means of connecting links 27, the upper extremities of which are hinged to a yoke 28. The yoke 28 is provided with a lifting rod 29 extending through a lifting sleeve 30 mounted on the extremity of a lifting crank 31, there being one crank for each row.

As the cranks 31 swing upwardly, they strike stop members 32 on the rods 29 to lift the latter. Compression springs 33 are positioned between set collars 34 on the rods 29 and the sleeves 30 so as to constantly urge the yokes 28 downwardly, and yet allow them to move resiliently upward.

A curved topping knife 35 extends between the lower extremities of each floating frame 25 and projects forwardly therefrom. A feeler frame 36 extends forwardly at each side of each floating frame 25 and across the front thereof. The sides of the feeler frames 36 are hinged at 37 on the links 27 so that the frames 36 may move independently of the frames 25.

The feeler frames 36 are constantly urged downwardly by means of compression springs 38 surrounding spring rods 39. The spring rods extend between the frames 36 and adjusting nuts 48 resting on supporting brackets 40 mounted on the frames 25. Thus, when the frames 25 are lifted, the rods 39 will lift the frames 36 therewith. Should the frames 36 be lifted, they will act through the springs 38 to resiliently lift the frame 25.

An endless feeler chain 41 extends from a sprocket shaft 42, journalled on each frame 16, forwardly through the adjacent frame 25, and around idler sprockets 43 mounted on each feeler frame 36.

A plurality of parallel top-receiving rods 44 extend rearwardly and upwardly from each of the knives 35 and terminate over a carrier chain 45 which extends from a sprocket shaft 46 on each frame 16 around idler sprockets 47 journalled on the lower links 26. A cross top-conveyor belt 49 having cross slats 107 is positioned below the rearward extremities of the chains 16.

To prevent overhanging or flattened tops and other trash from interfering, two cutting discs 50 are provided for each row. These discs are journalled on the lower extremities of hinged disc frames 51 and positioned at each side of each frame 25. The disc frames are forced downwardly against the ground to exert a cutting action by means of disc springs 52. They may be elevated for transportation by means of lifting rods 53 and lifting cranks 54. The upper extremities of the disc frames 51 are hinged at 55 on a portion of the main frame 16.

The top-conveyor belt 49 extends transversally of the harvester and projects from the right side thereof, as shown in Fig. 2, a distance equal to the distance between two beet rows. At the other extremity, the conveyor 49 terminates within the frame 16 alongside a beet row. Thus, when the harvester is reversed to harvest the next two rows of beets, the conveyor can be reversed to pile the tops along the preceding pile, so that there will be one pile of tops along the ground for each four rows of beets.

The reversing of the top-conveyor belt 49 is accomplished by means of two bevel gears 56 mounted on a sliding sleeve 57 which is splined on a drive shaft 58 driving the conveyor 29. The sleeve 57 can be shifted to bring either of the gears 56 into mesh with a bevel drive gear 59 through the medium of a shifting lever 60 connected to a hand lever 61 adjacent the operator's position.

The topping mechanism and the conveyor 49 are driven from a counter-shaft 62 which is connected through bevel gearing 63 with a cross shaft 106 which is connected to the shaft 42 by means of a drive chain 64. The shaft 62 drives the gear 59 through mitre gearing 65 and a vertical shaft 66. No drive is necessary for the topping chains 45 as they will be carried along by the chains 41.

The lifting cranks 31 and 54 are mounted on crank shafts 67, from which operating levers 68 project. The levers 68 are connected to draw rods 69 extending to the usual implement lift levers 24, which are hydraulically operated on the conventional tractor. The counter-shaft 62 is driven through the medium of a transmission chain 71 from the power takeoff 15 of the tractor through an overriding clutch 72.

The entire harvester moves forwardly along the two rows of beets. The tractor chains 41 are moving downwardly at their forward extremities, so that when a beet is encountered, that chain will climb upon the beet. In so doing it exerts a lifting action through the spring 38 on the knife 35, causing it to assume a predetermined relative position below the crown of the beet, so that the forward movement of the harvester will force the knife through the beet below the crown thereof. Therefore, the knife will assume a position on each beet depending upon the pre-setting of the adjusting nut 48. This position is not uniform, however, for all the beets, since the large and taller beets will exert a compressing action on the spring 38, resulting in a wider vertical space between the chain 41 and the knife than on smaller beets. Thus, the crowns are cut proportionate to the size of the beet, as in hand work.

The severed crowns and tops move rearwardly and upwardly along the rods 44 under the pressure of the oncoming tops and under the dragging action of the feeler chains 41, which sweep them onto the topping chains 45, where they are firmly held between the two chains 41 and 45 until deposited upon the cross top-conveyor belt 49.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. Means for removing the tops and crowns from a row of sugar beets comprising: a support-frame; means rigidly attaching said frame to a tractor; an inverted U-shaped floating frame spanning the row of beets; a pair of parallel, hinged, toggle arms extending from each side of said floating frame rearwardly and upwardly to said supporting frame; a topping knife extending across the bottom of said floating frame; a feeler frame hinged to and extending forwardly from said floating frame; means interposed between said two frames urging the feeler frame downwardly; sprockets carried by said feeler frame forwardly of said floating frame; an endless climbing chain trained around said sprockets; means for driving the lower reach of said feeler chain rearwardly so that it will act as a traction chain and climb up on each beet as approached to raise or lower said floating frame in consequence of the varying heights of said beets; other sprockets on said supporting frame positioned above and to the rear of said floating frame, said endless feeler chain being trained over said other sprockets to act to drag the severed tops rearwardly; and supporting means extending rearward from said knife and acting to support the severed tops beneath the lower reach of said feeler chain.

2. Means for removing the tops and crowns from a row of sugar beets comprising: a supporting frame; means rigidly attaching said frame to a tractor; an inverted U-shaped floating frame spanning the row of beets; a pair of parallel, hinged, toggle arms extending from each side of said floating frame rearwardly and upwardly to said supporting frame; a topping knife extending across the bottom of said floating frame; a feeler frame hinged to and extending forwardly from said floating frame; means interposed between said two frames urging the feeler frame downwardly; sprockets carried by said feeler frame forwardly of said floating frame; an endless climbing chain trained around said sprockets; means for driving the lower reach of said feeler chain rearwardly so that it will act as a traction chain and climb up on each beet as approached to raise or lower said floating frame in consequence of the varying heights of said beets; other sprockets on said supporting frame positioned above and to the rear of said floating frame, said endless feeler chain being trained over said other sprockets to act to drag the severed tops rearwardly; inclined top-receiving bars extending rearward from said knife; and an endless, flexible, top-supporting member receiving the severed tops and holding them in contact with said feeler chain.

3. Means for removing the tops and crowns from a row of sugar beets comprising: a supporting frame; means rigidly attaching said frame to a tractor; an inverted U-shaped floating frame spanning the row of beets; a pair of parallel, hinged, toggle arms extending from each side of said floating frame rearwardly and upwardly to said supporting frame; a topping knife extending across the bottom of said floating frame; beet-contacting means extending forwardly from said supporting frame to contact and pass over said beets in advance of said knife; means connecting said beet-containing means with said floating frame so as to raise and lower said floating frame in consequence of the height of said beets; a relatively sharp cutting disc positioned at each side and forwardly of said knife; a knife frame rotatably supporting said knives and extending forward and upward to a hinged connection with said main frame; and resilient means urging said knife frame downwardly.

4. Means for removing the tops and crowns from a row of sugar beets comprising: a supporting frame; means rigidly attaching said frame to a tractor; an inverted U-shaped floating frame spanning the row of beets; a pair of parallel, hinged, toggle arms extending from each side of said floating frame rearwardly and upwardly to said supporting frame; a topping knife extending across the bottom of said floating frame; beet-contacting means extending forwardly from said supporting frame to contact and pass over said beets in advance of said knife; means connecting said beet-contacting means with said floating frame so as to raise and lower said floating frame in consequence of the height of said beets; and means connecting said floating frame with an implement lift lever on said tractor for raising and lowering said floating frame.

5. Means for removing the tops and crowns from a row of sugar beets comprising: a supporting frame; means rigidly attaching said frame to a tractor; an inverted U-shaped floating frame spanning the row of beets; a pair of parallel, hinged, toggle arms extending from each side of said floating frame rearwardly and upwardly to said supporting frame; a topping knife extending across the bottom of said floating frame; a feeler frame hinged to and extending forwardly from said floating frame; means interposed between said two frames urging the feeler frame downwardly; sprockets carried by said feeler frame forwardly of said floating frame; an endless climbing chain trained around said sprockets; means for driving the lower reach of said feeler chain rearwardly so that it will act as a traction chain and climb up on each beet as approached to raise or lower said floating frame in consequence of the varying heights of said beets; other sprockets on said supporting frame positioned above and to the rear of said floating frame, said endless feeler chain being trained over said other sprockets to act to drag the severed tops rearwardly; supporting means extending rearward from said knife and acting to support the severed tops beneath the lower reach of said feeler chain; and a power-driven, transversely extending top conveyor supported from said supporting frame and positioned to receive the severed tops from said supporting means and convey them to one side of the row.

FRED L. SMITH.

REFERENCES CITED

The following references are of record in the file of this patent:

UNITED STATES PATENTS

| Number | Name | Date |
| --- | --- | --- |
| 684,250 | Holmes | Oct. 8, 1901 |
| 1,013,363 | Bates | Jan. 2, 1912 |
| 1,060,968 | Bocker | May 6, 1913 |
| 1,069,380 | Bocker | Aug. 5, 1913 |
| 1,149,345 | Deyl | Aug. 10, 1915 |
| 1,199,696 | Hawley | Sept. 29, 1916 |
| 1,235,490 | Kramer | July 31, 1917 |
| 1,257,168 | Wilson | Feb. 19, 1918 |
| 1,282,657 | Tussing | Oct. 22, 1918 |
| 1,315,381 | Merchant | Sept. 9, 1919 |
| 1,458,085 | Tabor | June 5, 1923 |
| 1,531,195 | Kopitke | Mar. 24, 1925 |
| 2,141,806 | Zielesch | Dec. 27, 1938 |
| 2,297,065 | McLendon | Sept. 29, 1942 |
| 2,337,698 | Walz | Dec. 28, 1943 |
| 2,369,850 | Powers | Feb. 20, 1945 |

FOREIGN PATENTS

| Number | Country | Date |
| --- | --- | --- |
| 22,095 | Great Britain | 1901 |
| 15,050 | Great Britain | 1909 |
| 847,739 | France | July 10, 1939 |